United States Patent
Lucas et al.

(10) Patent No.: US 10,873,510 B2
(45) Date of Patent: *Dec. 22, 2020

(54) PACKAGING TOOL FOR FIRST AND THIRD PARTY COMPONENT DEPLOYMENT

(71) Applicant: Microsoft Technology Licensing, LLC, Redmond, WA (US)

(72) Inventors: Shawn M. Lucas, Bellevue, WA (US); Robert S. T. Gibson, Duvall, WA (US); Cheng Wei, Bellevue, WA (US); Rahim Maknojia, Redmond, WA (US); Vitaly Bordovskiy, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/296,598

(22) Filed: Mar. 8, 2019

(65) Prior Publication Data
US 2019/0207820 A1    Jul. 4, 2019

Related U.S. Application Data

(63) Continuation of application No. 15/148,831, filed on May 6, 2016, now Pat. No. 10,250,452.
(Continued)

(51) Int. Cl.
*H04L 12/24* (2006.01)
*G06F 3/0484* (2013.01)
(Continued)

(52) U.S. Cl.
CPC .......... *H04L 41/145* (2013.01); *G06F 3/0482* (2013.01); *G06F 3/04817* (2013.01);
(Continued)

(58) Field of Classification Search
CPC combination set(s) only.
See application file for complete search history.

(56) References Cited

U.S. PATENT DOCUMENTS 9,244,669 B2 * 1/2016 Govindaraju ....... G06F 3/04842
9,893,959 B1 * 2/2018 Duet ...................... H04L 67/10
(Continued)

OTHER PUBLICATIONS

"Permutation Synonyms, Permutation Antonyms_ Thesaurus.pdf", Retrieved from: https://www.thesaurus.com/browse/permutation, Jul. 5, 2019, 1 Page.
(Continued)

*Primary Examiner* — Hien L Duong
(74) *Attorney, Agent, or Firm* — Alleman Hall Creasman & Tuttle LLP

(57) ABSTRACT

A cloud declarative language is used to configure and reconfigure cloud computing environments. The language includes physical and logical topology declarations as well as cloud operations commands, and allows users to declare commands at multiple topology hierarchies. The language may be used to create scripts and sets of scripts that are used to configure cloud stacks and other operational parameters. Scripts may be created through direct editing by cloud designers or with the aid of graphical user interfaces. Scripts may be automatically generated using templates of configurations and requirements and use for rapid prototyping and testing of cloud environments. Scripts may also be used to monitor conformance with specified configurations, and to facilitate deployment of incremental modifications to configurations.

20 Claims, 7 Drawing Sheets

Related U.S. Application Data

(60) Provisional application No. 62/267,203, filed on Dec. 14, 2015.

(51) Int. Cl.
*G06F 3/0482* (2013.01)
*G06F 3/0481* (2013.01)
*G06F 9/50* (2006.01)

(52) U.S. Cl.
CPC ........ *G06F 3/04842* (2013.01); *G06F 9/5072* (2013.01); *H04L 41/0869* (2013.01)

(56) References Cited

U.S. PATENT DOCUMENTS

| | | | |
|---|---|---|---|
| 2013/0198745 A1 | 8/2013 | De et al. | |
| 2013/0232480 A1* | 9/2013 | Winterfeldt | G06F 8/60 717/177 |
| 2013/0291052 A1* | 10/2013 | Hadar | G06F 21/6218 726/1 |
| 2014/0196022 A1* | 7/2014 | Skutin | G06F 8/61 717/176 |
| 2016/0077807 A1* | 3/2016 | Newman | G06F 9/5072 717/104 |

OTHER PUBLICATIONS

"Final Office Action Issued in U.S. Appl. No. 15/148,919", dated Jul. 12, 2019, 22 Pages.

"Non Final Office Action Issued in U.S. Appl. No. 15/148,919", dated Jan. 15, 2019, 20 Pages.

"Office Action Issued in European Patent Application No. 16816823. 5", dated Apr. 24, 2020, 6 Pages.

* cited by examiner

PACKAGING TOOL FOR FIRST AND THIRD PARTY COMPONENT DEPLOYMENT

CROSS REFERENCE TO RELATED APPLICATIONS

This application is a continuation of U.S. patent application Ser. No. 15/148,831, filed May 6, 2016, which claims the benefit of U.S. Provisional Patent Application Ser. No. 62/267,203, filed Dec. 14, 2015, the entire contents of each of which are incorporated by reference herein for all purposes.

BACKGROUND

Cloud computing infrastructure deployments are often complex, involving many kinds of information technology resources that are interconnected and interrelated in a number of ways. To ultimately serve a single end user, a cloud owner may engage the services of multiple third-parties resource and service providers to supplement the owner's proprietary software and services. Resources may include, for instance: client-facing web page support; back-end accounting, electronic commerce, and database operations; security certificate provision, support, and verification; virtual desktops and user operating environments; and specialty software applications. Resources may be hosted natively on "bare metal" servers, or on "virtual machines" whereby operating system environments for server or client devices are emulated by a host system.

The configuration of a cloud typically involves laborious manual configuration of individual resources combined with stitching these resources together with a variety of scripts written in languages specific to platforms on which the resources reside. Once a cloud design is completed, it may be iteratively tested and debugged via reconfiguration and edits to scripts, until satisfactory operation is achieved. At that time, image records of component resource configurations and setup scripts may be stored. These images may then be later recalled to deploy a cloud, repair damaged deployments, or to bring more cloud resources online in parallel with a deployed cloud.

SUMMARY

A cloud declarative language is used to configure and reconfigure cloud computing environments. The language includes physical and logical topology declarations as well as cloud operations commands, and allows users to declare commands at multiple topology hierarchies. The language may be used to create scripts and sets of scripts that are used to configure cloud stacks and other operational parameters. Scripts may be created through direct editing by cloud designers or with the aid of graphical user interfaces. Scripts may be automatically generated using templates of configurations and requirements and use for rapid prototyping and testing of cloud environments. Scripts may also be used to monitor conformance with specified configurations, and to facilitate deployment of incremental modifications to configurations.

DETAILED DESCRIPTION

Figure 1:
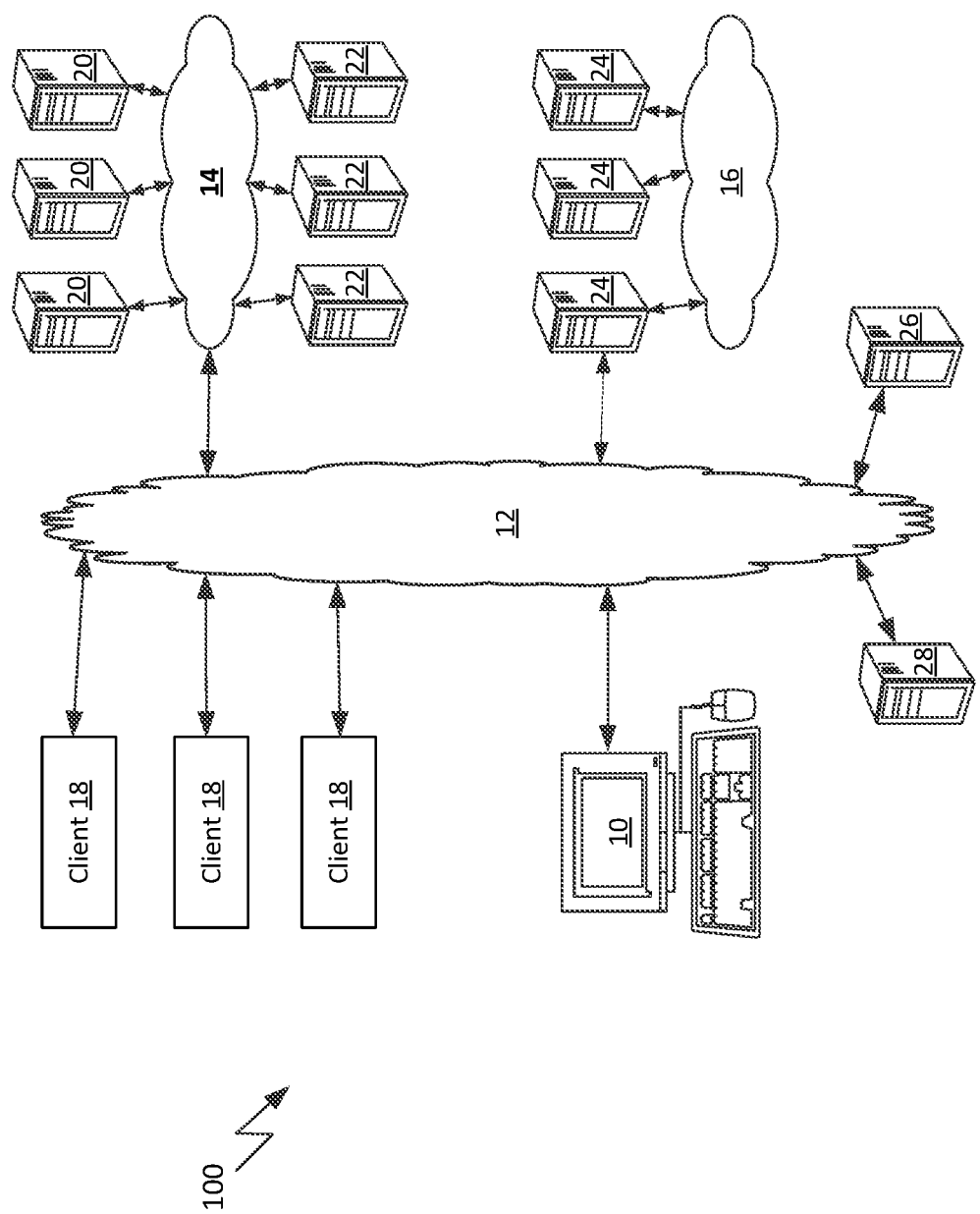
FIG. 1 is a system diagram of an example cloud environment.

Significant challenges are presented in cloud design, deployment, and maintenance by the wide variety of resource types, interfaces, programming languages, and operating systems involved. To address these challenges, a suite of solutions may be provided, including, inter alia: standardized cloud resource type definitions; standardized resource interfaces; a scripting language for defining and managing clouds; and software tools with graphical interfaces for cloud configuration management. Using such tools, cloud operators, such as cloud owners, may centrally observe and manipulate cloud configurations and deployments via a single standard interface, while minimizing the need for programmers and systems administrators to modify individual scripts, application settings, and platform configurations.

Such standardization provides the opportunity to automate the design, deployment, testing, and modification of cloud environments in new ways. For instance, it is often desirable to permute cloud configurations during testing or deployment to accommodate alternative resources or end user requirements. This may be achieved by first establishing a baseline cloud design via the descriptor language. The baseline cloud design may then be used to manually or automatically generate plural permuted configurations, resulting in plural cloud designs. Each of these cloud designs may then be used to automatically configure one or more separate cloud environments. For instance, a single cloud designs may be used to create both a "live" environment accessible by end users and a "testing" environment available only to developers working with the owner of the cloud.

Cloud computing solutions encompass not just multiple types of software written in multiple languages, but also fundamentally disparate tools operating in distinct ways networked across distinct platforms. For example, in the course of a single enterprise session, a user may use software applications written in C, Python, Java, Node.js, and .NET. Such applications may reside on a client apparatus and one or more remote servers. To support the session, myriad operations take place beyond those that the user is aware of, such as billing and credential verification services. To provide cloud-based computing or storage via the Internet or other networks, a cloud solution may include one or more data centers hosting various resource pools, such as collections of physical and/or virtualized computer servers, storage devices, networking equipment and the like, that may be used to implement and distribute the infrastructure and services offered by the cloud solution. The resources may take many forms, including physical computing infrastructure and logical or virtual instances of computing processes hosted on various physical infrastructures. A virtual computing instance may, for example, comprise one or more servers with a specified computational capacity, which may be specified by indicating the type and number of CPUs, the main memory size and so on, and a specified software stack, e.g., a particular version of an operating system, combined with a storage engine and/or application software.

Therefore a cloud system may include a multitude of system components each having any number of configuration parameters. In designing a cloud, a designer may address such high level considerations as capacity requirements planning (CRP) and network resource planning (NRP) in anticipation of the maximum load requirements and how the load should be balanced among available resources. This may include managing online and offline resources, e.g., network bandwidth, storage and computational resources, security relationships between remote devices and client devices through such technologies as Active Directory Federation Services (ADFS), and software restriction policies (SRP), in addition to Active Directory (AD) search and security, along with support of Domain Name Server (DNS) protocol and Dynamic Host Configuration Protocol (DHCP.)

Similarly, a designer may consider how a cloud will manage deployment and maintenance of software across the various cloud devices via automatic and semi-automatic mechanisms. For example, a cloud configuration may encompass Windows Deployment Services (WDS) operating system deployment and Windows Servers Update Services (WSUS.)

The robustness of a cloud may be addressed through configuration options pertaining to the division of computing labor across multiple processors in a single server or across multiple servers, as well as methods for detecting failures and switching over to alternate or backup resources. Myriad choices are available for local, network, and distributed data storage, e.g., through Scale-out File Services (SoFS.) Similarly, there are myriad ways to manage network traffic via controllers and gateways. Operations may be optimized, for instance, using just-in-time (JIT) administrative tools.

Security concerns in a cloud may be addressed through a variety of tools including simple scheduled backups to advanced threat analytics (ATA). In addition to AD user security measures, for instance, Just-Enough Administration (JEA) tools may be configured to limit console operations of power shell sessions.

All of these configuration options are in addition to fundamental enterprise and operating system configuration options, such as those managed by Desired State Configuration (DSC), and Enterprise Cloud Engine (ECE), and Operations Management Suite (OMS) tools.

FIG. 1 shows an example system 100 where a cloud configuration management station 10 is used to configure one or more cloud systems. A number of clients 18 communicate via a general network 12 to a set of cloud resources. The cloud resources include a cloud network 14, which may manage traffic between the clients 18 and resources such as the client facing servers 20 and back-end operations servers 22. There may be any number or virtual or real servers involved in providing the cloud services. Resources may be scaled out, e.g., brought online to serve in the cloud, as required. For example, more client facing servers 20 and/or more back-end servers 22 may be added, or even an additional cloud network 16 enlisted to add capacity as required to serve more clients 18. The additional network 16 may be physically and/or logically distant from cloud network 14, and involve any number of physical or virtual additional servers 24 to perform client-facing or back-end operations. In addition, certain tools or resources may be more efficiently "outsourced," e.g., not part of a local cloud provider network. For example, a certificate authority 26 or administrative services 28 server may be utilized remotely via the general network 12 to perform or assist with certain cloud operations.

In the example of FIG. 1, cloud configuration management station 10 is pictured as a terminal or personal computer with a traditional monitor, keyboard, and mouse. In practice, the configuration management station 10 could take any form, e.g., a laptop or tablet computer, or running on a virtual machine. From the cloud configuration management station 10, a cloud designer or manager configures cloud operations using software allowing the generation and distribution of cloud descriptors which are promulgated to the cloud networks 14 and 16, servers 20, 22, and 24, and, as required, to servers 26 and 28. Servers 20, 22, and 24, in turn, may adjust the configurations of clients 18 accordingly. Similarly, using a station 10, a cloud designer or manager could automate configuration management via description of configuration parameters and conditions triggering the use of the different configurations. Thereafter configuration management could be automated and/or provided as an automated service.

Figure 2:
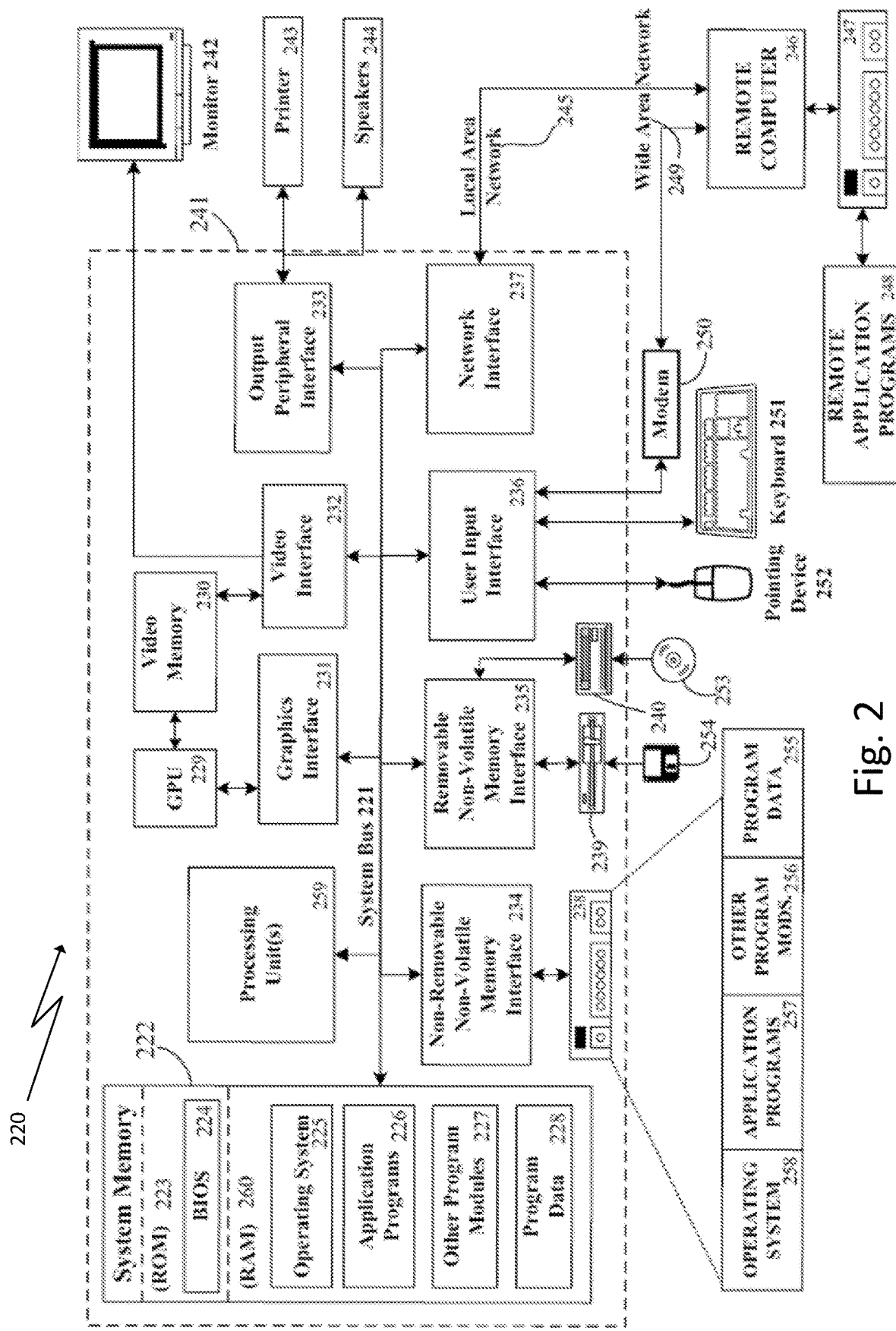
FIG. 2 is a system diagram of an example computing environment that may be used as a workstation or server.

FIG. 2 illustrates an example of a computing environment 220 that may be used as the cloud configuration management 10 shown in FIG. 1. The computing environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the example computing environment 220. The various depicted computing elements may include circuitry configured to instantiate specific aspects of the present disclosure. For example, the term circuitry used in the disclosure may include specialized hardware components configured to perform function(s) by firmware or switches. In other examples the term circuitry may include a general purpose processing unit, memory, etc., configured by software instructions that embody logic operable to perform function(s). In examples where circuitry includes a combination of hardware and software, an implementer may write source code embodying logic and the source code may be compiled into machine readable code that may be processed by the general purpose processing unit. Since one skilled in the art may appreciate that the state of the art has evolved to a point where there is little difference between hardware, software, or a combination of hardware/software, the selection of hardware versus software to effectuate specific functions is a design choice left to an implementer. More specifically, one of skill in the art may appreciate that a software process may be transformed into an equivalent hardware structure, and a hardware structure may itself be transformed into an equivalent software process. Thus, the selection of a hardware implementation versus a software implementation is one of design choice and left to the implementer.

In FIG. 2, the computing environment 220 comprises a computer 241, which typically includes a variety of computer readable media. Computer readable media may be any available media that may be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 2 illustrates operating system 225, application programs 226, other program modules 227, and program data 228.

The computer 241 may also include other removable/non-removable, volatile/nonvolatile computer storage media. By way of example only, FIG. 2 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that may be used in the example operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235. For purposes of this specification and the claims, the phrase "computer-readable storage medium" and variations thereof, does not include waves, signals, and/or other transitory and/or intangible communication media.

The drives and their associated computer storage media provide storage of computer readable instructions, data structures, program modules and other data for the computer 241. In FIG. 2, for example, hard disk drive 238 is illustrated as storing operating system 258, application programs 257, other program modules 256, and program data 255. Note that these components may either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, which may take the form of a mouse, trackball, or touch pad, for instance. Other input devices (not shown) may include a microphone, joystick, game pad, satellite dish, scanner, or the like. These and other input devices are often connected to the processing unit 259 through a user input interface 236 that is coupled to the system bus 221, but may be connected by other interface and bus structures, such as a parallel port, game port or a universal serial bus (USB). A monitor 242 or other type of display device is also connected to the system bus 221 via an interface, such as a video interface 232, which may operate in conjunction with a graphics interface 231, a graphics processing unit (GPU) 229, and/or a video memory 229. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 2. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 2 illustrates remote application programs 248 as residing on memory device 247. It will be appreciated that the network connections shown are examples and other means of establishing a communications link between the computers may be used.

Figure 3:
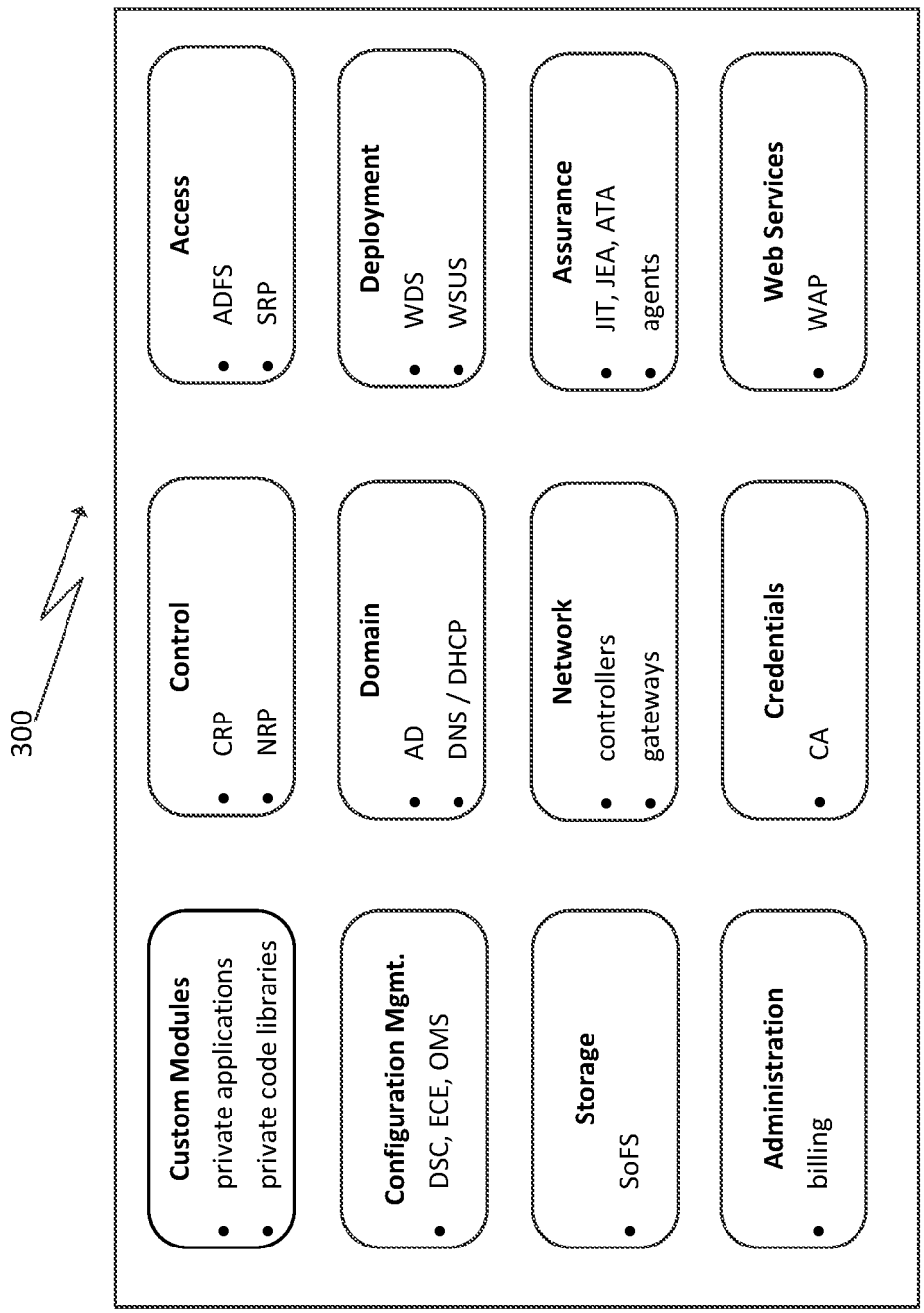
FIG. 3 is an example display of a graphical user interface for a cloud management system.

FIG. 3 is an example of a display of a graphical user interface (GUI) 300 for a software tool for managing cloud configurations. The GUI presents the cloud designer with a variety of options for configuring a variety of aspects of the network. Not shown, each option may have any number of supporting detail screens for the entry of different options, and storage, manipulation, and deployment of the configurations. As shown in FIG. 3, there are options for: incorporating propriety custom modules and code libraries in a cloud deployment such as options for: general control via CPR and NRP; access control via ADFS and SRP; configuration management via DCE, ECE, and OMS; domain management via AD, DNS, and DHCP; control of code and configuration deployment via WDS and WSUS; management of data storage, e.g., via SoFS; control network operations through configuration of controllers and gateways; operational integrity and security assurance via JIT, JEA, ATA, and/or active agents; as well as general administration, credentials management, and web services.

Other suites of tools may be available through the other implementations of such a GUI. For example, other configuration tools many be included for other kinds of cloud stacks, e.g., based on other operating systems, database tools, virtual environments, and applications.

Figure 4:
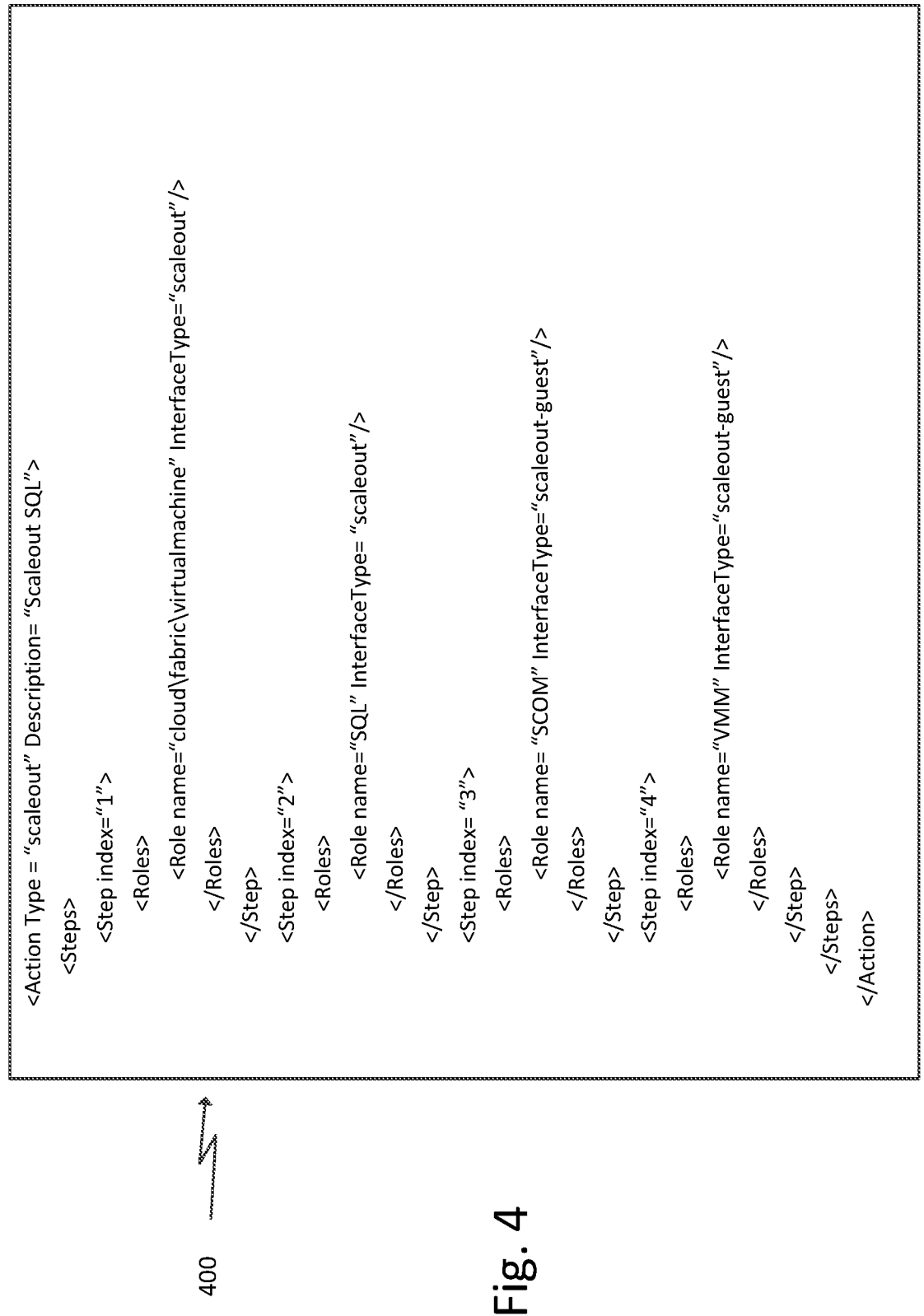
FIG. 4 is an example script for the scale out of capacity in a cloud environment.

FIG. 4 is a first example 400 of a use of a descriptor language to describe a series of steps to be taken in the formation of a cloud. Here the action is a scale out, i.e., adding capacity to a system by bringing another node online. In step 1, a virtual machine is identified as a role with a specified interface type. In step 2, an SQL database role is identified. In step 3, a system center operations manager (SCOM) role is identified, and in step 4, a virtual machine manager (VMM) role is identified. This may be a sufficient set of resources for a test environment, for example, with no client-facing web requirement.

If, however, a further web application proxy (WAP) and/or ADFS is required to manage a connection to a web client, there are a number of ways to add these to the cloud implementation. First, the WAP and ADFS could be added to the configuration through a second action comprising two steps. Second, two steps could be added to the four steps shown in FIG. 4. Notably this second option could be implemented automatically, whereby the additional steps are stored in a record of an option for generating the action, which is activated whenever a connection to a web client is called for. Thus a system may store both action descriptors and action component descriptors, and assemble action descriptors by permuting a baseline action descriptor according to programmed variations, e.g., to generate test environments and live environments, both with and without web client connections.

Similarly, a cloud configuration management system could store images of code, parameters, and data for both full configurations and for portions of configurations corresponding to various options.

Figure 5:
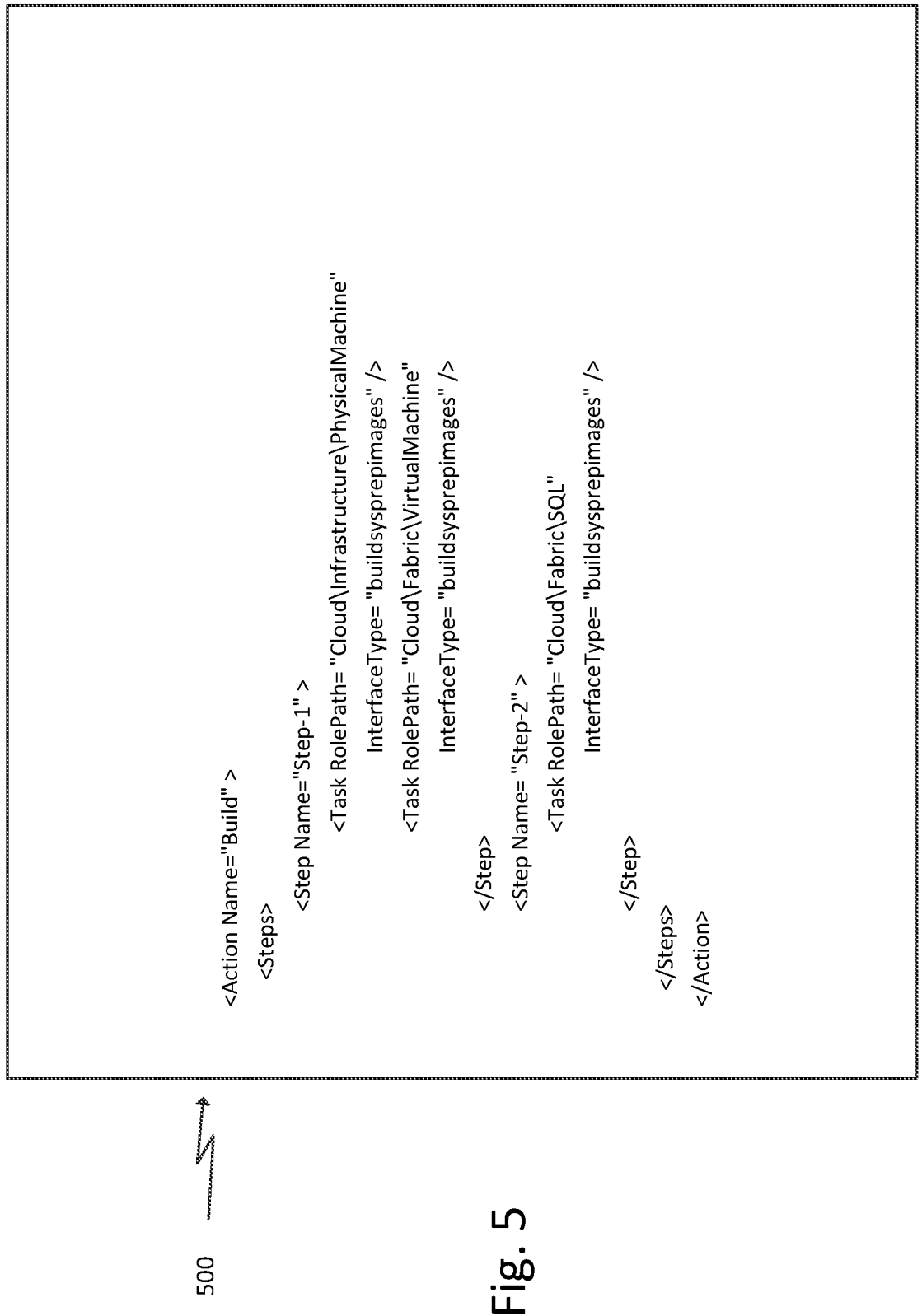
FIG. 5 is an example script for the build of a stack in a cloud environment.

FIG. 5 is a second example 500 of a use of a descriptor language to describe a series of steps to be taken in the formation of a cloud. Here the action is the build of a cloud stack. In step 1, a first task is defined stipulating the use of a particular physical machine as infrastructure for the cloud, and a second task is defined stipulating the use of a certain virtual machine as fabric for the cloud. In step 2, a task is defined stipulating the use of SQL as a database engine for the cloud stack.

Figure 6:
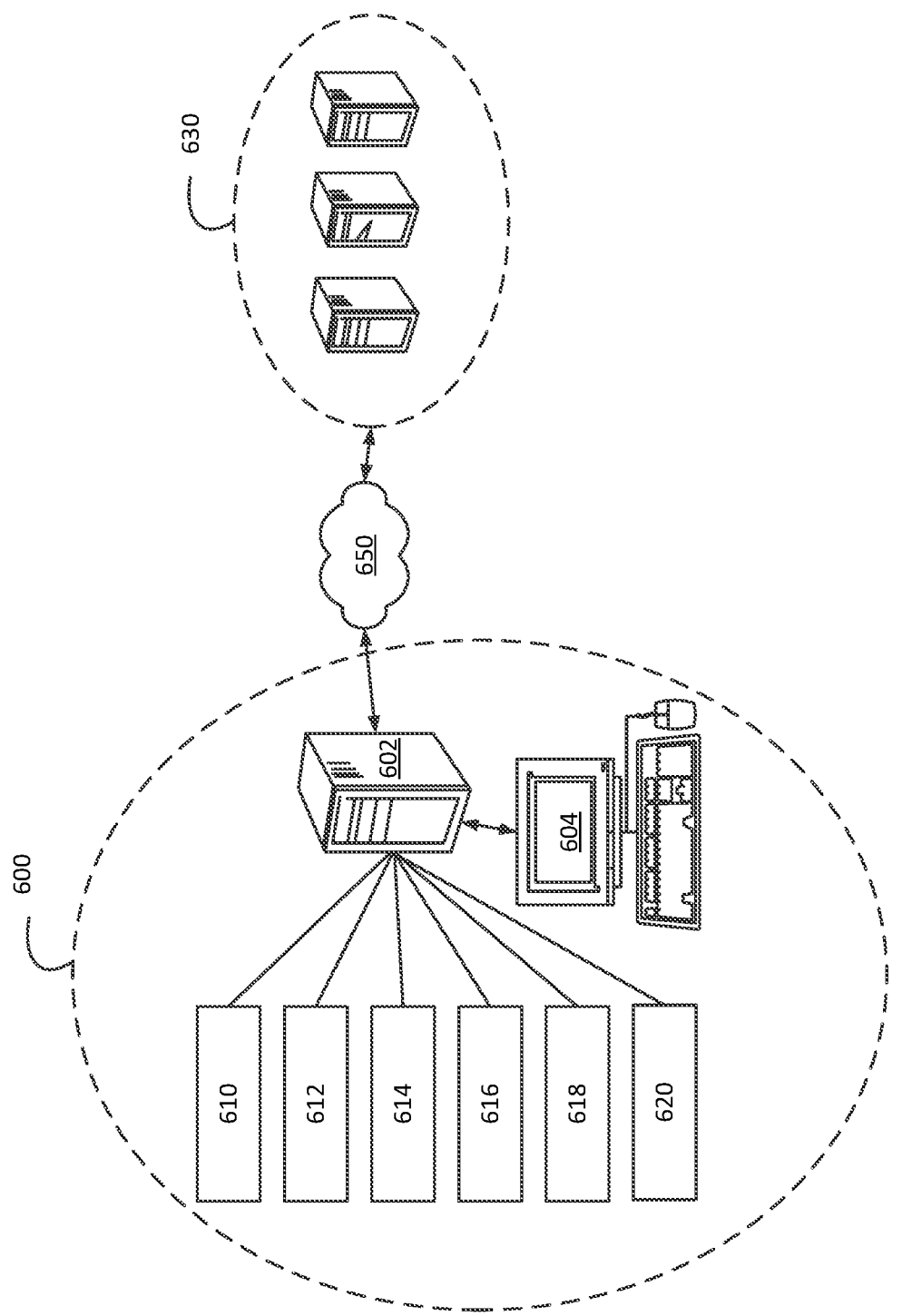
FIG. 6 is an example computer system managing a cloud design.

FIG. 6 is an example computing system for managing a cloud design. A computer 602 supports the presentation of a graphical user interface to a user at a station 604. Station 604 includes a display, a keyboard, and a mouse. The computer 602 accesses a database of available cloud design components 610, where the available cloud design components comprise one or more of user resources, database resources, and feature resources. The available cloud design components have a standard interface and are congruent with a descriptor language, which includes standardized parameters for the available cloud design components. The computer 602 instantiates a graphical user interface configured to render a listing of available cloud design components, which the user accesses via the station 604. The computer 602 receives, via the graphical user interface, a selection of the rendered available cloud design components for the cloud design. For example, the user may select and arrange the components where they are depicted as graphic icons, e.g., by drag-and-drop mouse operations. Alternatively or additionally, the computer may receive the user selections of available components from the user in the form of text that uses the descriptor language. The computer stores the cloud design 612 in a form congruent with the descriptor language.

In the cloud design 612, the computer 602 also stores information, such as parameters related to the configuration of the selected available components, in a form congruent with the descriptor language. Such information may be automatically generated in response to receiving the selection of the rendered available cloud design components. Additionally or alternatively, such parameters may be entered by the user via the station 604 using the descriptor language via text, or via drop-down menus or icon interfaces, for example.

The computer 602 may be configured to include, in the listing of available cloud design components, nested hierarchies of component groupings, where component parameters are maintained separately for each instance of a component in the hierarchy. This allows the user to manage cloud design in a modular form. Similarly, the computer 602 may be configured to store a library of custom modules 614 which may be used in creating in multiple cloud designs.

The computer 602 may be further configured to export the cloud design in a form comprising terms of the descriptor language 616. The exported design description 616 may then be transmitted, e.g., via a network 650, to other computer systems 630.

The computer 602 may be further configured to build a cloud deployment package 618 on demand according to the components selected and the specified component parameters. For example, the computer may gather the software, data, and parameters necessary and form images of cloud components to be deployed via the network 650 on other computers 630 to create or repair cloud deployments.

Similarly, the computer 602 may monitor the compliance of a cloud deployment to an intended cloud design. For example, the computer may compare the configuration of other computers 630 to a stored design 612, exported design 616, or package 618. The computer 602 may then, for example, create a report 620 of the number of discrepancies between the cloud design and the cloud deployment. The computer 602 may further apply changes to the cloud deployment to address at least one of the discrepancies. For example, the computer may install a new image of a cloud design package, or install those portions of the cloud design package which are not in conformity.

Figure 7:
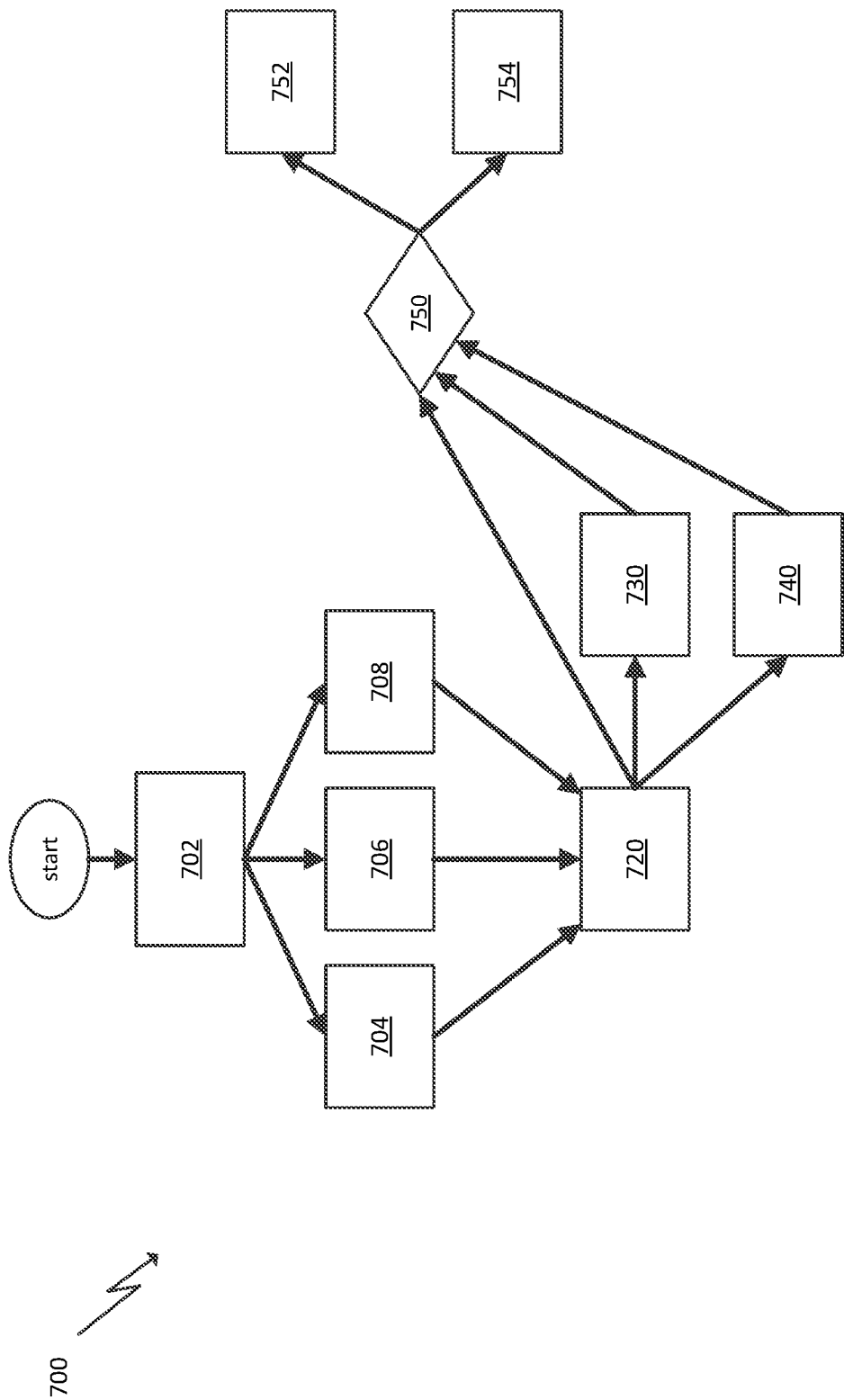
FIG. 7 is an example process for managing a cloud design.

FIG. 7 shows an example method 700 for managing a cloud design. In step 702, a computer system uses a database of available cloud design components to instantiate a graphical user interface configured to render a listing of available cloud design components. The available cloud design components comprise one or more of user resources, database resources, and feature resources, where the available cloud design components have a standard interface, and where the available cloud design components are congruent with a descriptor language including standardized parameters for the available cloud design components.

Depending on inputs from a user of the computer system via the graphical user interface, the system may proceed in a number of ways. In step 704, the computer may receive, via the graphical user interface, a selection of the rendered available cloud design components for the cloud design. For example, the user may enter a listing user the descriptor language, select graphic icons corresponding to available components, or select components via a drop-down menu system. The resulting listing is stored in a form congruent with the descriptor language in step 720.

In step 706, the system may adjust the performance of the selected components using the descriptor language to specify component parameters. This may occur automatically, in accordance to, for example, the order in which the user had made selections. Alternatively, the user may use the descriptor language, drop down menus, or graphic icons to enter or alter the parameters of selected components.

In step 708, nested hierarchies of component groupings are maintained. The component parameters are maintained separately for each instance of a component in the hierarchy. For example, the user may store a partial listing of available cloud design components as a custom module to be reused multiple times within a single cloud design, or used in multiple cloud designs. Such hierarchies may be stored separately, or with the cloud design via step 720 as required.

In step 730, the system optionally exports the cloud design in a form comprising terms of the descriptor language. In step 740, the system optionally builds a cloud deployment package on demand according to the components selected and the specified component parameters or according to an exported design.

Optionally, in step 750, the system optionally monitors cloud design compliance by comparing a deployment to an intended design. The intended design may be in the form of a listing of selected components and specified component parameters as created in step 720, an exported design as created in step 730, or a package as created in step 740, for example. In step 752, the system optionally reports a number of discrepancies between the cloud design and the cloud deployment. In step 754, the system optionally applies changes to the cloud deployment to address at least one of the discrepancies. At the end of any operation in method 700, the user may be returned to the graphical user interface in step 702 to initiate other activities.

A consistent packaging tool for application deployment in cloud environments may be achieved through the use of a GUI and a cloud descriptor language. By standardizing interfaces of component resources, a single platform may be used to configure a wide variety of cloud environments in a consistent manner, thus facilitating initial environment design and ongoing revision, augmentation, and maintenance. Such a tool may provide for a single framework for managing aspects of cloud deployments as diverse as: general controls such as CPR and NRP; access control via ADFS and SRP; configuration management via DCE, ECE, and OMS; domain management via AD, DNS, and DHCP; control of code and configuration deployment via WDS and WSUS; management of data storage, e.g., via SoFS; control network operations through configuration of controllers and gateways; operational integrity and security assurance via JIT, JEA, ATA, and/or active agents; as well as general administration, credentials management, and web services. In addition, the packaging tool may be used to incorporate propriety custom modules and code libraries in a cloud deployment, whereby a cloud developer may use the packaging tool to design, implement, and maintain a cloud environment through the tool substantial without needing to resort to the services of third-party vendors or programmers to code custom scripts and settings. Instead, the developer may specify which packages are to be used for deployment. Packages may then be built on-demand as part of the deployment workflow. Alternatively, the use of a tool with consistent GUI and descriptor language may facilitate cooperation among developers, vendors, and third-parties to define and deliver software services to be deployed in cloud environments.

For example, a computing system apparatus including a processor, a memory, and computer-executable instructions stored in the memory of the apparatus which, when executed by the processor of the apparatus, cause the apparatus to manage a cloud design via a graphical user interface and a database of available cloud design components. The cloud design components may include, for example, user resources, database resources, and feature resources. Many or all of the cloud design components may have standardized interfaces. Using the apparatus, a user may enter or construct a listing of cloud design components for the cloud design in a descriptor language using the graphical user interface. The descriptor language may use standardized parameters for the cloud design components, where the database is congruent with the descriptor language, such that the user may select components for the cloud design by selecting available components from the database. The user may also and adjust performance of one or more of the selected components using the descriptor language to specify component parameters.

Via the standardized interfaces and descriptor language, multiple cloud design components may be used interchangeably. For example, the database may include plural resource options for each of data storage management, domain management, software applications, and network management. Similarly the database may offer one or more options for each of access control, configuration management, configuration deployment, operational integrity assurance, credentials management, and web services.

The graphical user interface may provide for the listing of cloud design components in nested hierarchies of component groupings, where component parameters are maintained separately for each instance of the component in the hierarchy. This allows the designers considerable economies in reusing configurations from one cloud design to the next, or multiple times within a single cloud design. Such groupings may be stored, for example, in a library of custom modules stored in the database of the system.

Similarly, for ease of use, the graphical user interface may provide for the manipulation of the listing of cloud design components where one or more elements of the list are represented as graphic icons.

The system may include a configuration exporter, whereby the cloud design is exported in a form comprising terms of the descriptor language. This provides a short-hand notation for overall cloud configuration which may be readily shared among parties developing or using aspects of the cloud design. Similarly, the system may include a packager, whereby a cloud deployment package is built on demand according to the components selected and the specified component parameters. In contrast to the short-hand version exported in descriptor language format, the build may be complete and ready for deployment. Conveniently, the build may be created entirely by automated means, despite the disparate component types, by taking advantage of the standardized interfaces and descriptor language.

The system may further include a configuration compliance tool, whereby a cloud deployment is compared to the cloud design, where the configuration compliance tool reports a number of discrepancies between the cloud design and the cloud deployment. Such a tool may be further configured to package and apply changes to the cloud deployment to address at least one of the discrepancies.

The invention claimed is:

1. A system for managing a cloud design, comprising:
a processor and a memory storing thereon computer-executable instructions, the system communicatively coupled to a storage device storing a database of available cloud design components, where the available cloud design components comprise one or more of user resources, database resources, and feature resources, where the available cloud design components have a standard interface, and where the available cloud design components are congruent with a descriptor language including standardized parameters for the available cloud design components,
the system being configured such that, when executed by the processor, the computer-executable instructions cause the system to:
generate a graphical user interface at a computing device that includes a listing of the available cloud design components;
receive, via the graphical user interface generated at the computing device, a selection of the available cloud design components for the cloud design; and
adjust performance of one or more of the selected components using the descriptor language to specify component parameters,
wherein a single cloud design comprising the available cloud design components is used to create a live environment for use and a test environment for development, and
wherein the listing of the available cloud design components comprises hierarchies of component groupings, where component parameters are maintained separately for each instance of a component in a hierarchy of the hierarchies of component groupings, allowing reuse of one or more of the available cloud design components in one or more cloud designs.

2. The system of claim 1, wherein the database comprises plural resource options for each of data storage management, domain management, software applications, and network management.

3. The system of claim 1, wherein the database comprises options for at least one of: access control, configuration management, configuration deployment, operational integrity assurance, credentials management, and web services.

4. The system of claim 1, wherein one or more elements of the listing are represented as graphic icons and wherein the system is configured to manipulate the listing of the available cloud design components based on receiving an input.

5. The system of claim 4, wherein graphic icons representing the available cloud design components in the listing are configured to be manipulable by drag and drop operations to form the cloud design.

6. The system of claim 1, wherein the database comprises a library of custom modules.

7. The system of claim 1, further comprising a configuration exporter configured to export the cloud design in a form comprising terms of the descriptor language.

8. The system of claim 1, further comprising a packager configured to build a cloud deployment package on demand according to the components selected and the specified component parameters.

9. The system of claim 1, further comprising a configuration compliance tool configured to compare a cloud deployment to the cloud design and report a number of discrepancies between the cloud design and the cloud deployment.

10. The system of claim 9, wherein the configuration compliance tool is further configured to apply changes to the cloud deployment to address at least one of the discrepancies.

11. A method for managing a cloud design, comprising:
storing a database of available cloud design components, where the available cloud design components comprise one or more of user resources, database resources, and feature resources, where the available cloud design components have a standard interface;
generating a graphical user interface at a computing device that includes a listing of available cloud design components including hierarchies of component groupings, where component parameters are maintained separately for each instance of a component in a hierarchy of the hierarchies of component groupings, allowing for reuse of one or more of the available cloud design components in one or more cloud designs;
receiving, via the graphical user interface generated at the computing device, a selection of the available cloud design components for a cloud design; and
exporting the cloud design comprising the selection of the available cloud design components.

12. The method of claim 11, wherein the database comprises plural resource options for each of data storage management, domain management, software applications, and network management.

13. The method of claim 11, wherein the database comprises options for at least one of: access control, configuration management, configuration deployment, operational integrity assurance, credentials management, and web services.

14. The method of claim 11, wherein the available cloud design components are congruent with a descriptor language including standardized parameters for the available cloud design components, and wherein the method further comprises adjusting performance of the selected components using the descriptor language to specify component parameters.

15. The method of claim 11, wherein one or more elements of the listing of available cloud design components are represented as graphic icons in the graphical user interface.

16. The method of claim 15, wherein the graphic icons representing the available cloud design components in the listing are configured to be manipulable by drag and drop operations to form the cloud design.

17. The method of claim 11, wherein the database comprises a library of custom modules.

18. The method of claim 11, further comprising building a cloud deployment package on demand according to the components selected and specified component parameters.

19. A method for monitoring cloud design compliance, comprising:
storing a database of available cloud design components, where the available cloud design components comprise one or more of user resources, database resources, and feature resources, where the available cloud design components have a standard interface;
generating a graphical user interface at a computing device that includes a listing of available cloud design components represented as graphic icons, the listing of available cloud design components including hierarchies of component groupings, where component parameters are maintained separately for each instance of a component in a hierarchy of the hierarchies of component groupings, allowing for reuse of one or more of the available cloud design components in one or more cloud designs,
receiving, via drag and drop operations performed in the graphical user interface generated at the computing device, a selection of the available cloud design components for a cloud design; and
exporting the cloud design comprising the selection of the available cloud design components, wherein the cloud design is used to create a live environment for use and a test environment for development.

20. The method of claim 19, further comprising comparing a cloud deployment to the cloud design, reporting a number of discrepancies between the cloud design and the cloud deployment, and applying changes to the cloud deployment to address at least one of the discrepancies.

* * * * *